United States Patent
Kelley, Jr.

(10) Patent No.: US 6,988,604 B2
(45) Date of Patent: Jan. 24, 2006

(54) FRICTION CLUTCH PACK HAVING A MOTOR DRIVEN BALL RAMP OPERATOR

(75) Inventor: William R. Kelley, Jr., Novi, MI (US)

(73) Assignee: BorgWarner Inc., Auburn Hills, MI (US)

(*) Notice: Subject to any disclaimer, the term of this patent is extended or adjusted under 35 U.S.C. 154(b) by 4 days.

(21) Appl. No.: 10/827,657

(22) Filed: Apr. 19, 2004

(65) Prior Publication Data

US 2005/0230217 A1 Oct. 20, 2005

(51) Int. Cl.
*F16H 25/08* (2006.01)

(52) U.S. Cl. ............... 192/70.24; 192/84.6; 192/84.91; 192/93 A

(58) Field of Classification Search ............... 192/54.5, 192/70.23, 70.24, 84.6, 84.9, 84.91, 93 A
See application file for complete search history.

(56) References Cited

U.S. PATENT DOCUMENTS

| | | | |
|---|---|---|---|
| 4,550,817 A | 11/1985 | Euler | |
| 4,874,056 A | 10/1989 | Naito | |
| 5,045,038 A | 9/1991 | Sherlock | |
| 5,484,033 A * | 1/1996 | Frank et al. | ............... 180/245 |
| 5,819,883 A | 10/1998 | Organek et al. | |
| 5,899,951 A | 5/1999 | Babbel et al. | |
| 6,318,532 B1 | 11/2001 | Gassmann | |
| 6,349,809 B1 | 2/2002 | Isley, Jr. | |
| 6,460,677 B1 | 10/2002 | Roscoe | |
| 6,520,885 B2 | 2/2003 | Gassmann et al. | |
| 6,533,090 B2 | 3/2003 | Osborn et al. | |
| 6,571,928 B1 | 6/2003 | Gassmann | |
| 6,578,693 B2 * | 6/2003 | Mayr | ............... 192/226 |
| 6,886,679 B2 * | 5/2005 | Katsnelson et al. | ......... 192/226 |
| 2002/0100657 A1 | 8/2002 | Vonnegut et al. | |

* cited by examiner

*Primary Examiner*—Saul Rodriguez
(74) *Attorney, Agent, or Firm*—Brinks Hofer Gilson & Lione; Greg Dziegielewski

(57) ABSTRACT

An electromagnetic clutch especially adapted for use in motor vehicle power trains includes a multiple plate friction clutch pack acted upon (compressed) by a ball ramp operator. The ball ramp operator includes two adjacent plates having opposed pairs of arcuate ramped recesses which receive a load transferring member such as a ball or roller bearing. Relative rotation of the plates is achieved through a worm gear drive from a bi-directional electric motor. Such relative rotation causes separation of the plates and compression of the friction clutch pack which transfers torque from the input to the output of the electromagnetic clutch.

16 Claims, 3 Drawing Sheets

US 6,988,604 B2

FRICTION CLUTCH PACK HAVING A MOTOR DRIVEN BALL RAMP OPERATOR

BACKGROUND OF THE INVENTION

The invention relates generally to a friction clutch pack having a ball ramp operator and more specifically to a friction clutch pack having a ball ramp operator actuated by a bi-directional electric motor.

Notwithstanding significant sales of light and medium duty trucks, an emphasis upon improved vehicle performance and gas mileage remains. Within the arena of engineering details, this emphasis takes several forms. The first is the obvious approach of weight reduction. Such weight reduction exempts virtually no part of the vehicle: engine, power train, chassis, suspension, steering gear body, seating, windows, and options.

The high gas mileage goal also affects the design of electrical components as reducing current consumption has a corresponding affect on gas consumption. This emphasis has encouraged the use of electrical devices which exhibit reduced current consumption. Components which exhibit both significant power consumption and have a significant duty cycle, such as electric clutches, are carefully studied.

One such class of clutches is referred to as ball ramp clutches. These clutches, in addition to a friction plate or multiple plate friction clutch pack, include an operator comprising a pair of adjacent circular plates having a plurality of opposed arcuate ramped recesses which each receive a ball bearing. Relative rotation of the circular plates causes the ball bearings to ride up the ramps of the recesses and separate the plates, thereby engaging the clutch. An electromagnetic coil may be utilized to create drag which causes the plates to rotate relatively. In this design, it is the speed differential and the energy of such speed differential which causes engagement of the clutch. That is, the electromagnetic force generated by the electromagnetic coil does not directly engage the clutch but acts upon the ball ramp operator which, in turn, engages the clutch. So configured the electromagnetic coil can be significantly smaller and consume less electricity than a direct acting clutch. In addition to the weight reduction, heat dissipation is also a less significant concern. Thus, overall, a ball ramp clutch can be significantly more compact than a direct acting electromagnetic clutch.

Actuation of the clutch, however, does require relative rotation, that is, a speed difference between the input and the output of the clutch. This is seldom an operational disadvantage, however, inasmuch as if there is no speed difference, there is no need to engage the clutch and, in fact, engagement requires only the smallest speed differential.

Nonetheless, the ability to effect clutch engagement independent of a shaft speed differential is seen as a benefit in certain operational conditions. The present invention addresses this desire.

SUMMARY OF THE INVENTION

An electromagnetic clutch especially adapted for use in motor vehicle power trains includes a multiple plate friction clutch pack acted upon by a ball ramp operator. The ball ramp operator includes two adjacent plates having a plurality of opposed pairs of arcuate ramped recesses which receive a load transferring members such as ball or roller bearings. Relative rotation of the plates is achieved through a worm gear drive from a bi-directional electric motor. Such relative rotation causes separation of the plates and compression of the friction clutch pack which transfers torque from the input to the output of the electromagnetic clutch.

It is thus an object of the present invention to provide an electromagnetic clutch especially adapted for use in motor vehicle power trains.

It is a further object of the present invention to provide an electromagnetic clutch having a multiple plate friction clutch pack acted upon by a ball ramp operator.

It is a still further object of the present invention to provide an electromagnetic clutch having a multiple plate friction clutch pack acted upon by a ball ramp operator actuated by a bi-directional electric motor.

It is a still further object of the present invention to provide a multiple plate friction clutch pack acted upon by a ball ramp operator actuated by a bi-directional electric motor which is especially adapted for use as a clutch to provide torque to a rear differential and the wheels of a primary front drive vehicle.

Further objects and advantages of the present invention will become apparent by reference to the following description of the preferred embodiment and appended drawings wherein like reference numbers refer to the same component, element, or feature.

DETAILED DESCRIPTION OF THE PREFERRED EMBODIMENT

Figure 1:
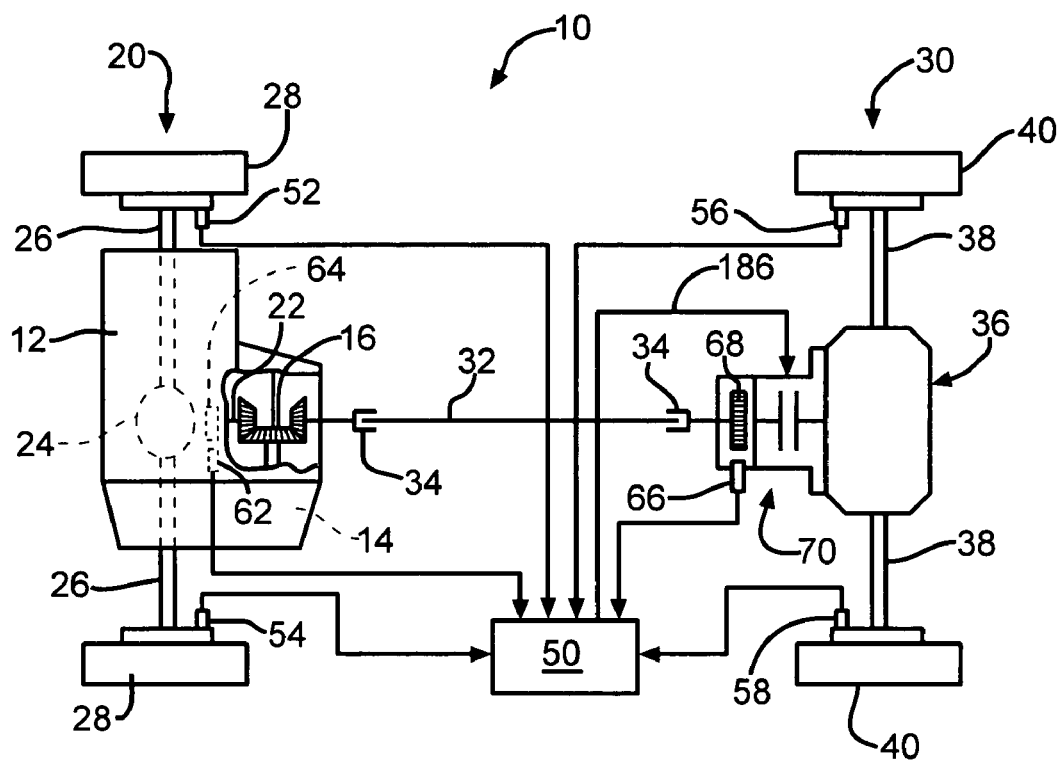
FIG. 1 is a diagrammatic, plan view of a four-wheel drive motor vehicle power train having an electromagnetic ball ramp clutch according to the present invention.

Referring now to FIG. 1, a four-wheel vehicle drive train incorporating the present invention is diagrammatically illustrated and designated by the reference number 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40.

The foregoing description relates to a vehicle wherein the primary drive line 20 is disposed at the front of the vehicle and, correspondingly, the secondary drive line 30 is disposed at the rear of the vehicle, such a vehicle commonly being referred to as an adaptive front wheel drive vehicle. The designations "primary" and "secondary" utilized herein refer to a drive line providing drive torque at all times and a drive line providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration of FIG. 1, wherein the primary drive line 20 is disposed at the front of the vehicle should be understood to be illustrative rather than limiting and that the components and the general arrangement of components illustrated is equally suitable and usable with an adaptive rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a controller or microprocessor 50 which receives signals from a plurality of sensors and provides a control, i.e., actuation signal to an electromagnetic clutch assembly 70 operably disposed before the secondary differential assembly 36. Specifically, a first sensor such as a variable reluctance or Hall effect sensor 52 senses the rotational speed of the right primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor 58 associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted in the vehicle for anti-lock brake systems (ABS) or other speed sensing and traction control equipment. It is also to be understood that an appropriate and conventional counting or tone wheel is associated with each of the speed sensors 52, 54, 56 and 58 although they are not illustrated in FIG. 1.

The controller or microprocessor 50 may also receive information regarding the output speed of the transaxle 14. A variable reluctance or Hall effect sensor 62 which is associated with a tone wheel 64 on the front or primary prop shaft 22 may be utilized. In the alternative, a variable reluctance or Hall effect sensor 66 associated with the secondary differential assembly 36 and positioned adjacent a tone wheel 68 on an input shaft of the secondary differential assembly 36 may also be utilized. The controller or microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct or compensate for a skid or other anomalous operating condition of the vehicle and provides an output signal to the electromagnetic clutch assembly 70.

Figure 2:
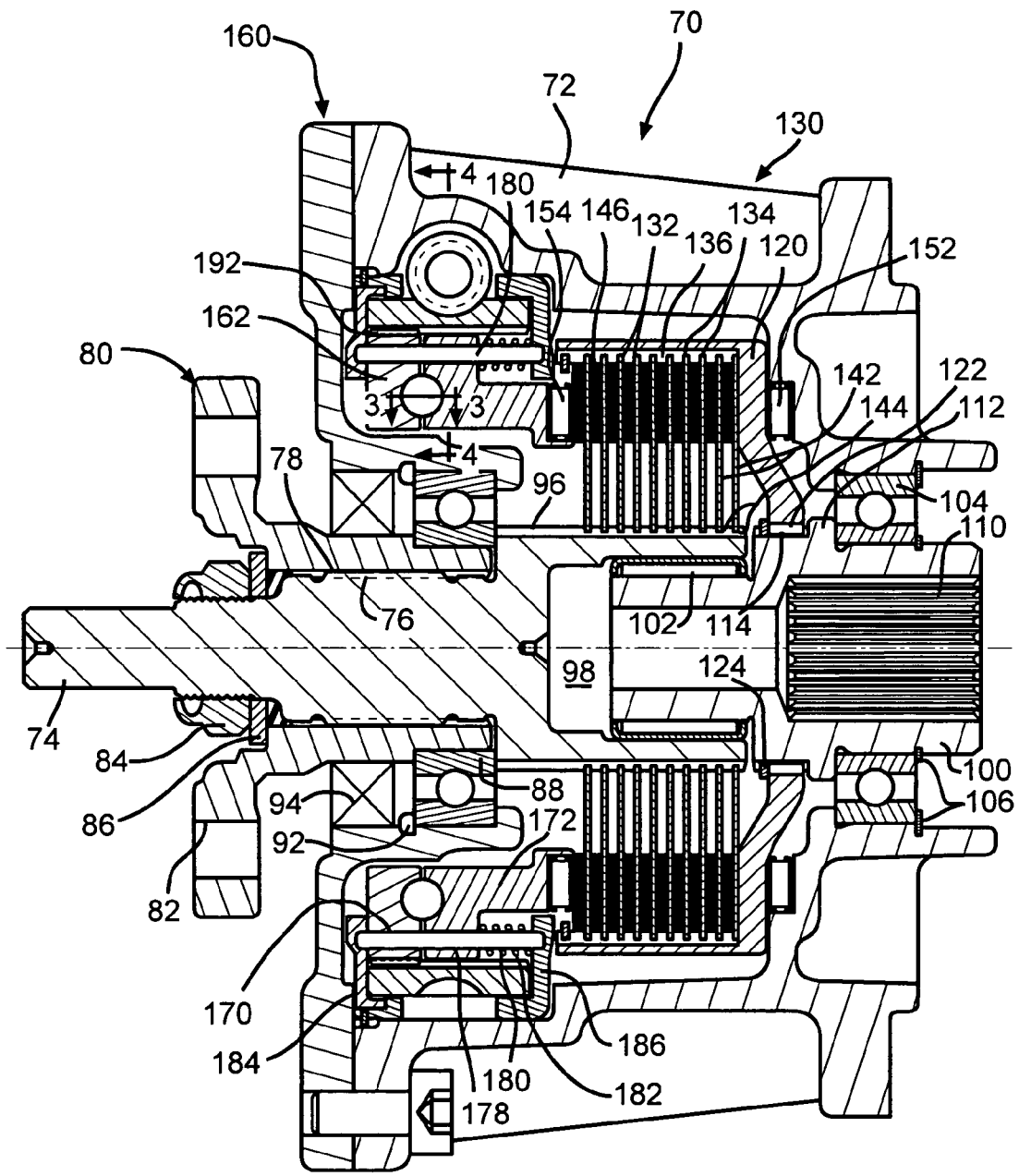
FIG. 2 is a full, sectional view of an electromagnetic clutch having a friction clutch pack and a ball ramp operator driven by a bi-directional electric motor.

Referring now to FIG. 2, the electromagnetic clutch assembly 70 includes a preferably cast, two component housing 72 which includes various apertures, recesses, shoulders, and the like which receive, position and support various components and sub assemblies of the electromagnetic clutch assembly 70. An input shaft 74 includes an enlarged diameter threaded portion having external or male splines 76 which are complementary to and engaged by internal female splines 78 formed on the interior portion of an input flange 80. The input flange 80 includes through axial passageways 82 which may receive fasteners or components, for example, of the universal joint 34, illustrated in FIG. 1. The input flange 80 is secured to and retained upon the input shaft 74 by a threaded fastener such as a nut 84 and a flat washer 86. The input shaft 74 and the flange 80 are positioned and supported by an antifriction bearing such as a ball bearing assembly 88 which is retained within the housing by a snap ring 92. An oil seal 94 extends between the exterior surface of the input flange 80 and the housing 72 and inhibits the passage of clutch fluid from within the housing 72 and contaminants into the housing 72. The input shaft 74 includes a plurality of external or male splines or gear teeth 96.

The input shaft 74 also includes a counterbore 98 which receives a portion of an output shaft 100. A reduced diameter portion of the output shaft 100 which is received within the counterbore 98 supports and is supported by a roller bearing assembly 102. An antifriction bearing such as a roller bearing assembly 104 freely rotatably supports the output shaft 100 within the housing 72. The ball bearing assembly 104 and the output shaft 100 are axially positioned and retained by a pair of snap rings 106. The output shaft 100 includes a set of internal or female splines 110 which may engage and drive components (not illustrated) within the rear differential assembly 36, illustrated in FIG. 1.

The output shaft 100 defines a shoulder 112 between the ball bearing assembly 104 and a region of external or male splines or gear teeth 114. An output bell housing 120 includes a smaller diameter region of internal or female splines 122 which are complementary to and engage the male splines 114 on the output shaft 100. Thus, the output bell housing 120 rotates with the output shaft 100. A snap ring 124 maintains the output bell housing 120 in a proper axial position on the output shaft 100 adjacent the shoulder 112 and engaged with the male splines 114.

The electromagnetic clutch assembly 70 also includes a multiple plate friction clutch pack assembly 130. The friction clutch pack assembly 130 includes a first plurality of larger diameter friction clutch plates or discs 132 having a plurality of male or external splines 134 which are complementary to and engage internal or female splines 136 on the inner surface of the output bell housing 120. Thus, the first plurality of clutch plates or discs 132 rotates with the output bell housing 120 and the output shaft 100. Interleaved with the first plurality of clutch plates 132 is a second plurality of smaller diameter friction clutch plates or discs 142. The second plurality of smaller diameter friction clutch plates or discs 142 includes internal or female splines 144 which are complementary to and engage the male splines 96 on the input shaft 74. Thus, the second plurality of clutch plates or discs 142 rotate with the input shaft 74. It will be appreciated that appropriate, adjacent surfaces of the friction clutch plates or discs 132 and 142 include clutch paper or friction material 146 which provides suitable frictional coupling between the clutch plates or discs 132 and 142 when they are compressed.

A first roller thrust bearing assembly 152 is disposed between the output bell housing 120 and the housing 72 and a second roller thrust bearing assembly 154 is disposed between the opposite end of the friction clutch pack 130 and a ball ramp operator assembly 160.

Figure 3:
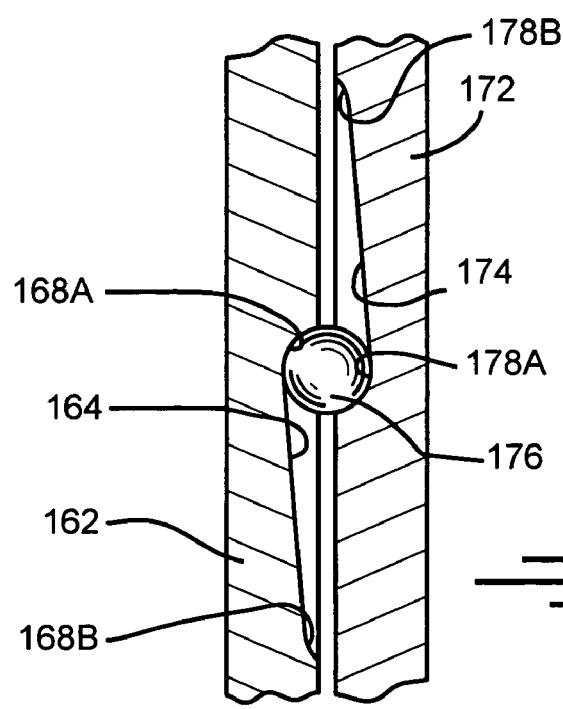
FIG. 3 is a flat pattern development of the ball ramp operator in an electromagnetic clutch according to the present invention taken along line 3—3 of FIG. 2.
Figure 4:
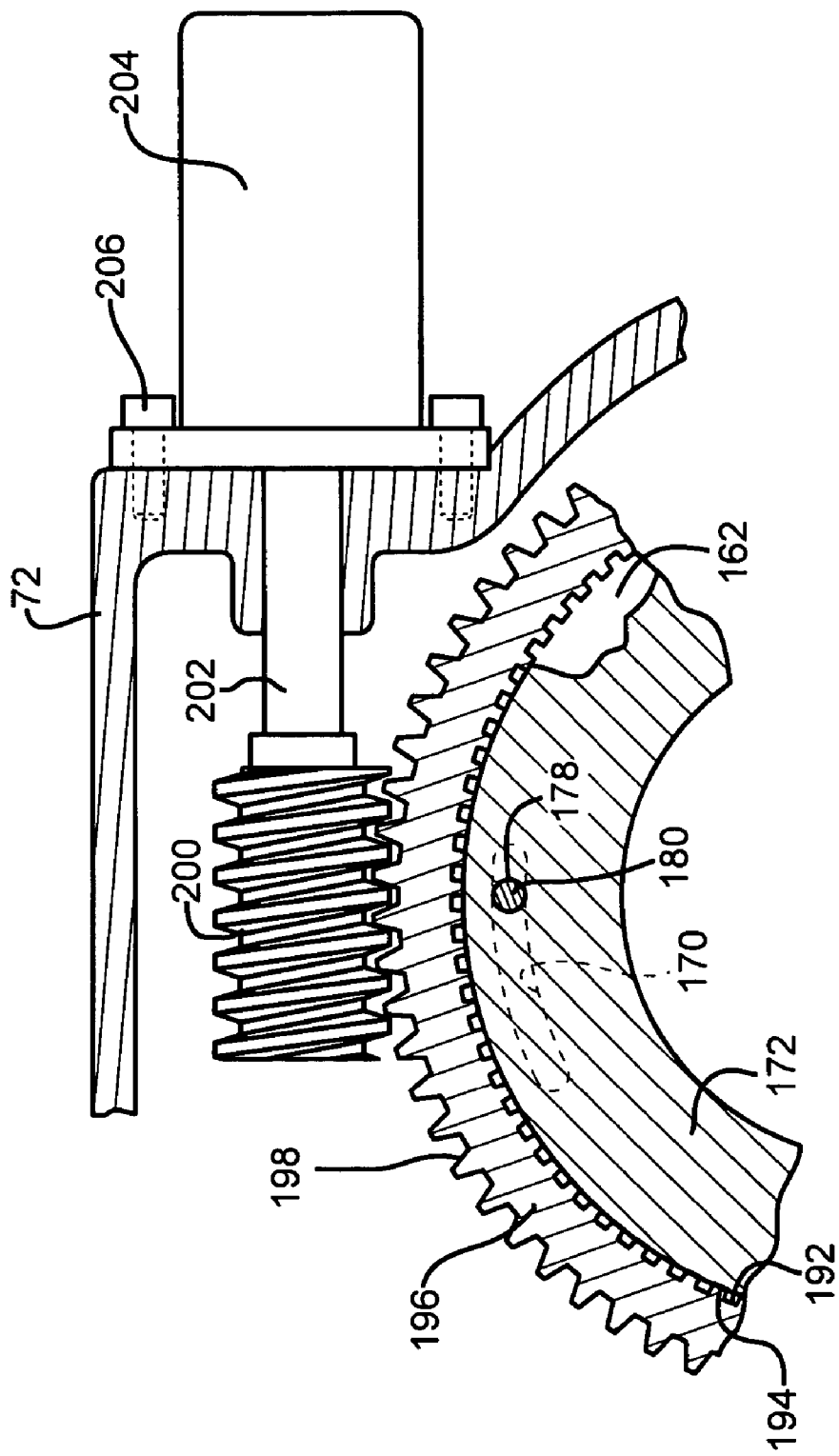
FIG. 4 is a fragmentary, enlarged sectional view of the drive of the ball ramp operator in an electromagnetic clutch according the present invention taken along line 4—4 of FIG. 2.

Referring now to FIGS. 2, 3 and 4, the ball ramp operator assembly 160 includes a first, rotatable member 162 which includes a plurality of, preferably three, unidirectionally ramped recesses 164 defining a deep cupped end 168A and a shallow cupped end 168B. The first rotatable member 162 also includes a plurality of arcuate slots 170. Adjacent the first rotatable member 162 is a second, non-rotatable, axially moveable member 172. The second, axially moveable member 172 includes a like plurality of, again, preferably three, unidirectionally ramped recesses 174 similarly having a deep cupped end 178A and a shallow cupped end 178B. In the relaxed position of the clutch assembly 70, the deep cupped ends 168A and 178A of the first and second members 162 and 172, respectively, are adjacent one another and receive load transferring members such as ball bearings 176. The cupped ends 168A, 168B, 178A and 178B of the ramped recesses 164 and 174 ensure retention of the ball bearings 176.

The second, axially moveable member 172 includes a plurality of through holes or apertures 178 which receive a like plurality of register pins 180 extending through the arcuate slots 170 of the first member 162. Disposed about the register pins 180 along their portions extending beyond the second member 172 are compression springs 182 which provide a biasing or restoring force which urges the second member 172 to the left, as illustrated in FIG. 2, to relax compression of the friction clutch pack assembly 130. The ends of the register pins are received and retained within stationary circular frames 184 and 186. Thus, the register pins 180 are stationary and inhibit rotary motion of the second moveable member 172 while permitting it to axially translate.

It will be appreciated that the recesses 164 and 174 and the load transferring members 176 may be replaced with other analogous mechanical elements which cause axial displacement of the second, moveable member 172 in response to relative rotation therebetween. For example, tapered rollers disposed in complementarily configured conical helices or cam plates having a plurality of opposed, complementary oblique surfaces may be utilized.

An important design consideration of the recesses 164 and 174 and the load transferring members 176 is that their geometry and the overall design and clearances of the ball ramp operator assembly 160 ensure that the clutch assembly 70 is not self-engaging. The electromagnetic clutch assembly 70 must not self-engage but rather must be capable of modulating clamping of the friction clutch pack assembly 130 in direct, proportional response to the signal provided by the controller or microprocessor 50.

Referring now to FIGS. 2 and 4, the outer periphery if the first member 162 includes male or external splines or gear teeth 192 which are complementary to and engage internal or female splines or gear teeth 194 on an annular drive ring or collar 196. The annular drive ring or collar 196 includes external gear teeth 198 which are engaged and driven by a worm gear 200. The worm gear 200 is secured to a driveshaft 202 which is driven by a bi-directional electric motor 204 which is, in turn, secured to the housing 72 by a plurality of threaded fasteners 206. The bi-directional electric motor is driven by an output of the microprocessor 50.

In operation, as the driveshaft 202 of the bi-directional electric motor 204 rotates, typically upon a command from the microprocessor 50, the ring gear 196 rotates about its axis at a greatly reduced speed. As it rotates, it rotates the first, rotatable member 162 thereby causing the ball bearings 176 to roll up the ramps 164 and 174 and translate the second member 172 toward the friction clutch pack assembly 130. Translation of the second member 172 and compression of the friction clutch pack assembly 130 transfers torque from the input shaft 74 to the output shaft 100. It will be appreciated that because of the anti-backdrive characteristics of the worm gear 200 and the teeth 198 of the ring gear 196, cessation of motion of the electric motor 204 will result in maintenance of the compression of the friction clutch pack 130 and maintenance of the level of torque throughout.

As the electric motor 204 is commanded to rotate in the opposite direction by the microprocessor 50 or other controller, the ring gear 96 and first member 162 likewise rotate in a direction which releases pressure on the friction clutch pack assembly 130, such pressure release aided by the compression springs 182 which urge the second member 172 to the left, to the relaxed position illustrated in FIGS. 2 and 3.

The foregoing disclosure is the best mode devised by the inventor for practicing this invention. It is apparent, however, that devices incorporating modifications and variations will be obvious to one skilled in the art of electromagnetic ball ramp clutches. Inasmuch as the foregoing disclosure is intended to enable one skilled in the pertinent art to practice the instant invention, it should not be construed to be limited thereby but should be construed to include such aforementioned obvious variations and be limited only by the scope and spirit of the following claims.

I claim:

1. An electrically actuated clutch for a secondary vehicle driveline comprising, in combination:
   an input member adapted to be driven by a transmission;
   an output member adapted to drive a differential;
   a friction clutch pack having a first plurality of clutch plates coupled for rotation with said input member and a second plurality of clutch plates interleaved with said first plurality of said clutch plates and coupled for rotation with said output member;
   a ball ramp actuator disposed adjacent said friction clutch pack and having a first member defining a first plurality of ramped recesses, a second member defining a second plurality of ramped recesses facing said first plurality of ramped recesses and a plurality of load transferring members cooperatively disposed in said pluralities of ramped recesses;
   at least one return member extending axially through an arcuate slot in one of said members and an aperture in another of said members and a compression spring disposed about said return member for providing a disengaging force to said ball ramp actuator; and
   an electric actuator for rotating one of said members relative to another of said members.

2. The electrically actuated clutch of claim 1 wherein said differential is a rear differential.

3. The electrically actuated clutch of claim 1 further including a worm gear drive between said electric actuator and said one of said members.

4. The electrically actuated clutch of claim 1 wherein said electric actuator is a bi-directional electric motor.

5. The electrically actuated clutch of claim 1 wherein said load transferring members are ball bearings.

6. The electrically actuated clutch of claim 1 wherein said output member includes a plurality of splines.

7. An electrically actuated clutch assembly comprising, in combination, an input member, an output member, a friction clutch pack having a first plurality of clutch plates disposed for rotation with said input member and a second plurality of clutch plates interleaved with said first plurality of clutch plates and disposed for rotation with said output member, a ball ramp operator having a first member defining a plurality of ramped recesses, a second member adjacent said first member and defining a like plurality of ramped recesses and a like plurality of load transferring members disposed in said ramped recesses, a stationary member extending through an aperture in one of said members and an arcuate slot in another of said members and a compression spring disposed about said stationary member biasing said one of said members toward said other of said members; and an electric operator having a rotating bi-directional output adapted to bi-directionally rotate said first member, whereby bi-directional rotation of said output rotates said first member and actuates and deactuates said friction clutch pack.

8. The electrically actuated clutch assembly of claim 7 wherein said load transferring members are balls.

9. The electrically actuated clutch assembly of claim 7 wherein said first member is rotatable and said second member is axially translatable.

10. The electrically actuated clutch assembly of claim 7 wherein said electric operator is a bi-directional electric motor.

11. The electrically actuated clutch assembly of claim 7 further including a worm gear on said output of said electric operator and a gear complementary to said worm gear adapted to drive said first member.

12. An electric clutch assembly comprising, in combination, an input shaft, an output shaft, a friction clutch pack having a first plurality of clutch plates coupled to said input shaft and a second plurality of clutch plates interleaved with said first plurality of clutch plates and coupled to said output shaft, a ball ramp operator having a first plate defining a plurality of ramped recesses, a second plate adjacent said first plate and defining a like plurality of ramped recesses and a like plurality of load transferring members disposed in said ramped recesses, a stationary pin extending axially through an arcuate slot in one of said first and second plates and an aperture in another of said first and second plates and a compression spring on said pin for biasing said first and second plates toward one another, and an electric operator having a rotating, bi-directional output for rotating said first plate bi-directionally.

13. The electrically actuated clutch assembly of claim 12 wherein said load transferring members are balls.

14. The electrically actuated clutch assembly of claim 12 wherein said first plate is rotatable and said second plate is axially translatable.

15. The electrically actuated clutch assembly of claim 12 wherein said electric operator is a bi-directional electric motor.

16. The electrically actuated clutch assembly of claim 12 further including a worm gear on said output of said electric operator and a gear complementary to said worm gear adapted to drive said first plate.

* * * * *